April 3, 1928. 1,664,787
G. E. OAKLEY
AIR BRAKE
Filed Feb. 3, 1926
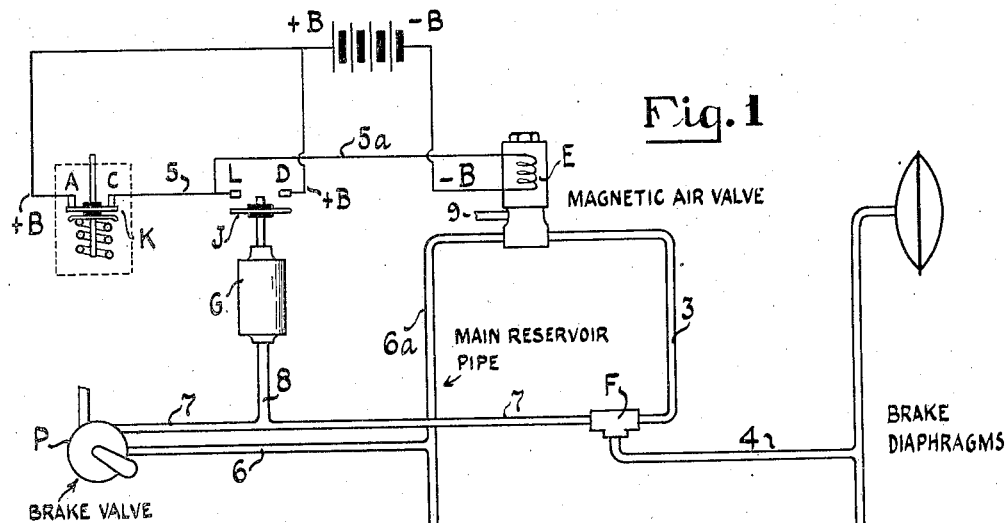
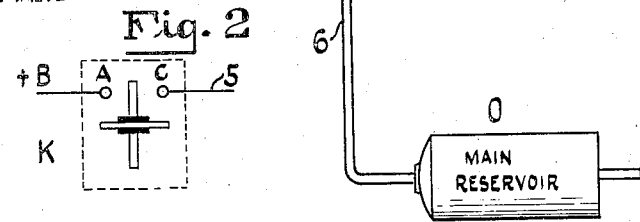
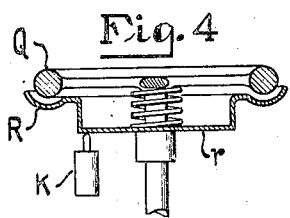
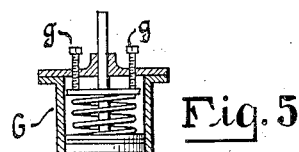
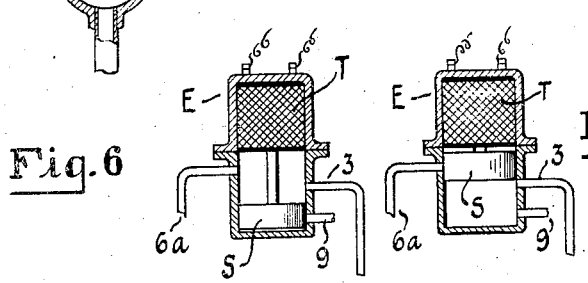
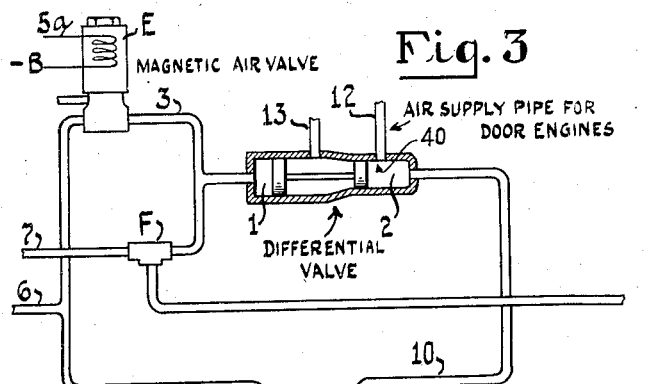
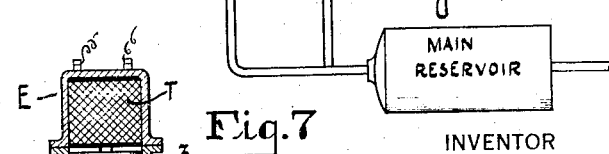
INVENTOR
GEORGE E. OAKLEY
BY
*E. M. Bentley*
ATTORNEY Patented Apr. 3, 1928.

1,664,787

UNITED STATES PATENT OFFICE.

GEORGE E. OAKLEY, OF ALBANY, NEW YORK, ASSIGNOR, BY MESNE ASSIGNMENTS, TO CONSOLIDATED CAR-HEATING COMPANY, INC., OF ALBANY, NEW YORK, A CORPORATION OF NEW YORK.

AIR BRAKE.

Application filed February 3, 1926. Serial No. 85,664.

For a detailed description of the present form of my invention, reference may be had to the following specification and to the accompanying drawing forming a part thereof, wherein Fig. 1 is a diagrammatic view of my brake system;

Fig 2 is a diagrammatic view showing the steering wheel switch in open circuit position;

Fig. 3 illustrates the automatic control of the air supply for the door engine;

Figs. 4, 5, 6 and 7 show details.

My invention relates to air brakes and is particularly useful in motor busses which have air-operated doors.

Referring to the drawings, O in Fig. 1 represents the air reservoir from which pipe 6 leads to the usual hand valve P that admits air via pipe 7 to the ordinary double-check valve F and thence, by pipe 4, to the brake diaphragms. From pipe 7 a branch pipe 8 leads to a cylinder G (see Fig. 5) which, when air pressure is admitted to it from pipe 7, acts against a spring to close an electric switch J which thereby connects contacts L and D. Another switch K is normally spring-pressed against contacts A and C, but is forced away therefrom, as shown in Fig. 2, whenever the motorman lets go his hold on the steering wheel. Thus, as shown in Fig. 4, the steering wheel Q may carry a light plate R which is lifted whenever the motorman grasps the steering wheel, but when he lets go drops down and, by means of a spring-pressed disc r, acts to depress the stem of switch K and open the circuit to cause the application of the brakes, provided the brakes have not already been applied by the hand valve P. This may be termed an emergency application. If the brakes have been applied by the hand valve P then the pressure in cylinder G will close switch J and thereby prevent the circuit being opened, as aforesaid, by switch K. The switch J will, if thus closed, provide a connection from plus battery via contacts D and L to the wire 5 and thereby maintain the circuit from the battery to wire 5ª and control magnet E which would have otherwise been opened by the switch K when the motorman released the steering wheel.

The control valve E is of the magnetic type and known as a reversed valve, since when the magnet is deenergized the brake pipes are connected to the air supply but are cut off therefrom and open to the exhaust when the magnet is energized. Thus in Fig. 6 the piston-valve S shuts off the exhaust 9 and connects the brake pipe 3 to the supply pipe 6ª, the magnet T being at this time de-energized, but in Fig. 7, wherein the magnet is energized and valve S lifted, the brake-pipe 3 is open to exhaust and the supply pipe 6ª is shut off. One prominent advantage of my arrangement is that the spring of valve G can be adjusted in strength by the screws $g, g$. Thereby it can be made certain that the automatic application of the brakes, when the motorman lets go of the steering wheel, will not be averted unless there is a pronounced brake pressure in the cylinder G admitted thereto by the hand valve P. Moreover, my arrangement is extremely simple and cheap and also reliable, considering the results it achieves.

Fig. 3 shows the automatic control of the door engine. A large cylinder 1 is opposed to a smaller cylinder 2, the former being connected to the brake-pipe 3 and the latter to the main air reservoir O by pipe 10. From cylinder 2 a pipe 12 leads by port 40 to the door engine, and a pipe 13 leads to the exhaust. The pistons of the respective cylinders are connected. Normally the reservoir pressure, which exists in small cylinder 2, keeps the two pistons in their left hand position, the air then being admitted to the door engine through port 40 and pipe 12. But when the brake air is admitted to cylinder from pipe 3 it will act on the larger piston to force both pistons to the right. That will cause the piston cylinder 2 to pass by port 40, shutting off the air pressure therefrom and opening it to exhaust 13. That will continue until the brake air is released, when the pressure on the smaller piston 2 will move both pistons back to their normal left hand position, as shown.

In operation the brakes will remain off while the vehicle is running, subject, however, to application at any time by the hand valve P, as usual. This assumes that the motorman is holding the steering wheel in the normal way to direct the moving vehicle. But if, for any reason, the motorman lets go his steering wheel the brakes will be automatically applied as above described. At the same time the pressure which now exists in pipe 3 will act, as described in connection with Fig. 3, to exhaust the pressure on the door engine and allow the door to be opened by hand. The usual double deck-valve F will permit the flow of air to the brakes from either pipe 3 or pipe 7 alternately.

I do not intend to claim broadly either a method or means for an emergency or automatic application of the brakes when the operator releases the steering wheel nor the release of the door when the brakes are applied.

No claim is made herein for the control of the brake system through the door engine, because this subject matter is described and claimed in a separate co-pending application Serial No. 176,223.

What I claim as new and desire to secure by Letters Patent is:

1. An air-brake system comprising a brake-controlling valve, an electromagnet therefor, a steering wheel, and a switch for said magnet, and a circuit closing contact for said switch located adjacent to the steering wheel so that it may be gripped by the operator while grasping said steering wheel.

2. An air-brake system comprising a brake-controlling valve, an electromagnet therefor normally energized and a circuit-breaker for said magnet dependent on the actuation of the steering wheel of the vehicle.

3. An air-brake system comprising a brake-controlling valve, an electromagnet therefor, a controlling switch for said magnet and a retaining switch therefor operated by the applied air pressure in the air system.

4. An air-brake system comprising a manual brake-controlling valve, an electrical brake-controlling valve and magnet therefor, and a switch for said magnet operated by the pressure admitted by said manual valve to the brake.

5. An air-brake system comprising a manual brake-controlling valve, an electrical brake-controlling valve with its magnet, a double-check valve, a switch for said magnet, a controller for said switch on the steering wheel of the vehicle, and a second switch for said magnet controlled by the manually admitted air pressure.

6. An air-brake system comprising a manual brake-controlling valve, an electrical brake-controlling valve with its magnet, means for controlling the circuit to said magnet, said circuit controlling means being controlled by but independent of said manual valve.

7. An air-brake system comprising a manual brake-controlling valve, an electrically operated brake-controlling valve and automatic means for controlling said electrically operated valve consisting of two switches one constituting a circuit-breaker dependent on the operator's grasp of the steering wheel for the vehicle and the other a retaining switch dependent on manually admitted air pressure.

Signed at Albany, county of Albany, State of New York, this 30th day of January, 1926.

GEORGE E. OAKLEY.